C. F. DUTTON, Jr.
PROJECTION LANTERN SLIDE HOLDER.
APPLICATION FILED MAR. 31, 1909.

951,417.

Patented Mar. 8, 1910.

ATTEST
E. M. Fisher
J. C. Mussun.

INVENTOR
Charles F. Dutton Jr.
By Fisher & Moser ATTYS.

UNITED STATES PATENT OFFICE.

CHARLES F. DUTTON, JR., OF CLEVELAND, OHIO.

PROJECTION-LANTERN SLIDE-HOLDER.

951,417.  Specification of Letters Patent.  Patented Mar. 8, 1910.

Application filed March 31, 1909. Serial No. 487,061.

*To all whom it may concern:*

Be it known that I, CHARLES F. DUTTON, Jr., citizen of the United States, residing at Cleveland, in the county of Cuyahoga and State of Ohio, have invented certain new and useful Improvements in Projection-Lantern Slide-Holders, of which the following is a specification.

My invention relates to a new and useful improvement in projection lantern slide holders, all substantially as shown and described and particularly pointed out in the claims.

Figure 1:
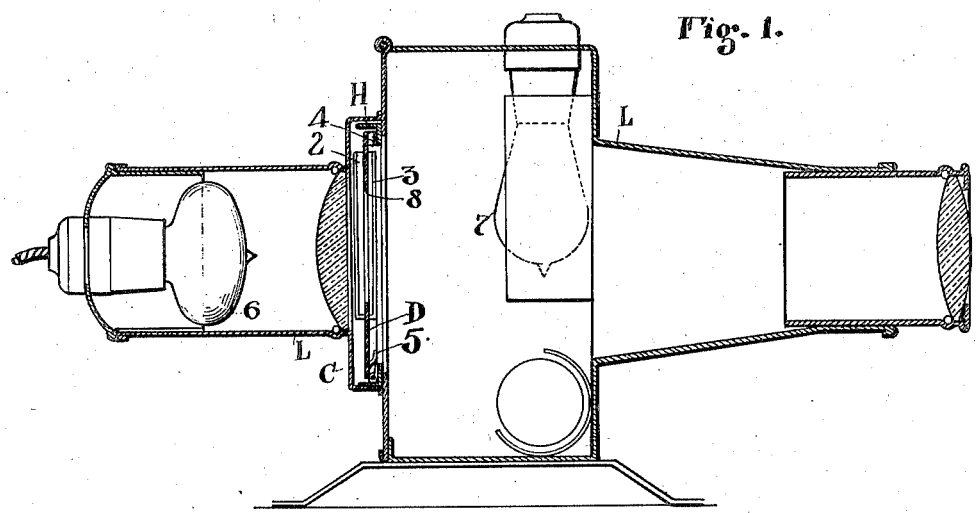
Figure 2:
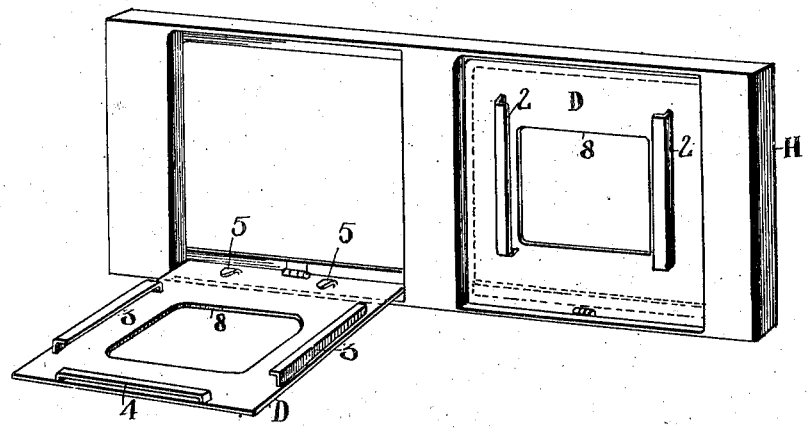

In the accompanying drawings, Figure 1 is a sectional elevation of a lantern showing my improved holder in cross section therein, and Fig. 2 is a perspective view of the holder with one of the hinged slide supports or shutters down to show the inner side.

The novelty in the foregoing views lies mainly in the novel and original means for displaying both ordinary glass slides and opaque or dark slides, like post-cards, in the same holder, with lights differently disposed as to both to get the desired effects as will hereinafter appear.

In Fig. 1 L represents the lantern as an entire embodiment and H the slide holder adapted to be slidably mounted therein, as holders usually are, so as to bring the slides in the respective halves or portions thereof into focus alternately, whether the usual slides or post cards or the like be employed for display. Now, it is more particularly in this alternative use or adaptation of the holder that the invention resides, and to this end the said holder has a rectangular opening in each half and a slide support or shutter D hinged at the bottom of each opening adapted to close said opening. The said shutters or doors are hinged to swing down in order to render both sides thereof equally available for using either kind of slide therewith, and each shutter or door is provided on one side with parallel angle iron or equivalently shaped retaining guides 2 for the glass slides, and substantially similar guides 3 on its other or front side for the post-cards. As to these latter guides or supports, however, they are shown spaced apart far enough to receive a card lengthwise between them, while guide 4 is shown across the upper portion of the shutter adapted to receive the card endwise, and rests 5 at the bottom support the card when thus inserted. This affords accommodation for cards with pictures in either position thereon. Obviously these means for engaging both the glass slides and the cards may be of any kind that will confine the same removably in the holder.

I have referred to post-cards particularly, but of course any other card bearing a picture or designs which may be thrown upon a screen can be used if it be of the right size. These cards are opaque and will not show the light through as glass slides do, and hence I require a lamp 6 for the glass slides located at the rear thereof, and a lamp or lamps 7 located in front of the holder for opaque cards, the pictures in this latter case being reflected on the screen.

It should have been stated that each shutter or door D has a central opening 8 through which the glass slide shows, but which is of no service if cards be shown because they cover the same over at the front. Only one set of lamps is used at a time according as a glass slide or a card slide is displayed.

The lantern shell or casing has a chamber C adapted to receive the holder H and lamp 6 is designed to be used exclusively with glass or translucent slides, while lamp 7 is designed to be used exclusively with opaque or card slides.

What I claim is:

1. In projection lanterns, a slide holder adapted to support glass slides on one side thereof and card slides on the other side.

2. A slide holder for projection lanterns provided with separate means for supporting glass and opaque slides respectively.

3. A projection lantern and a slide holder therein having a hinged door with a central opening and constructed on one side to support a translucent slide and an opaque slide on the outer, and a separate lamp for each of said slides disposed before and behind said holder respectively.

In testimony whereof I affix my signature in presence of two witnesses.

CHARLES F. DUTTON, JR.

Witnesses:
E. M. FISHER,
F. C. MUSSUN.